United States Patent [19]
Johnson et al.

[11] Patent Number: 5,359,646
[45] Date of Patent: Oct. 25, 1994

[54] TESTING OF DISTRIBUTED COMMUNICATIONS NETWORKS

[75] Inventors: Myranda A. Johnson, Freehold; Timothy J. Zebo, Red Bank, both of N.J.

[73] Assignee: Bell Communications Research, Inc., Livingston, N.J.

[21] Appl. No.: 876,856

[22] Filed: Apr. 30, 1992

[51] Int. Cl.$^5$ .................. H04M 1/24; H04M 3/08; H04M 3/22
[52] U.S. Cl. ............................... 379/27; 379/29; 379/26; 379/31
[58] Field of Search ................. 379/1, 13, 26, 12, 27, 379/14, 29, 37; 370/14, 16, 17

[56] References Cited

U.S. PATENT DOCUMENTS

| | | | |
|---|---|---|---|
| 4,076,970 | 2/1978 | Lubarsky, Jr. et al. | 179/175.2 |
| 4,459,436 | 7/1984 | Rubin | 179/175.2 |
| 4,464,543 | 8/1984 | Kline et al. | 379/16 X |
| 4,692,761 | 9/1987 | Robinton | 370/17 X |
| 4,887,289 | 12/1989 | Montegari et al. | 379/22 |
| 5,008,929 | 4/1991 | Olsen et al. | 379/112 |
| 5,018,184 | 5/1991 | Abrams et al. | 379/29 |
| 5,040,177 | 8/1991 | Martin et al. | 370/110.1 |
| 5,065,393 | 11/1991 | Sibbitt et al. | 379/13 X |

OTHER PUBLICATIONS

"Advanced Intelligent Network Release 1 Network and Operations Plan," Special Report, SR-NPL-001623, Issue 1, Jun. 1990, Bell communications Research.
"Common Channel Signaling 7 Information Guide," 256-002-100, AT&T Network Systems, Issue 2, Jun. 1988.

*Primary Examiner*—Stephen Chin
*Assistant Examiner*—Paul Coomis
*Attorney, Agent, or Firm*—Leonard Charles Suchyta; Loria B. Yeadon

[57] ABSTRACT

A system and method for testing subscriber's services and sectionalizing service trouble in distributed networks, such as Advanced Intelligent Network (AIN), includes a test call set-up component, which enables a tester to set-up a test call. A test call can be set up by the tester by interactively defining the test environment and other information to emulate a call from a subscriber's communication line. A test call can also be set-up by marking triggers in the subscriber's trigger criteria and by marking the subscriber's subscription data at the service control point/adjunct. The test call set-up component also establishes a maintenance parameter which defines the environment in which a test call is to be processed and the data to be collected, if any, during the test call. Our testing system and method also include a call history log component, which is used to collect actual data associated with the processing of a test call at each network node in the form of an actual call history log, which can be retrieved by the tester. Also, an expected call history log for each network node can be generated. The actual and expected call history logs generated at each processing node can be used by the tester to provide an end-to-end view of processing activity for the test call and to sectionalize trouble in the network.

25 Claims, 14 Drawing Sheets

TEST CALL SET-UP COMPONENT

CALL HISTORY
LOG COMPONENT

FIG. 9A

| ACTUAL CALL HISTORY LOG: SCP | | |
|---|---|---|
| TIME | SOURCE DESTINATION | MESSAGE |
| 12: 01: 00: 03 | FROM: ASC-SWITCH-ID | INFO_ANALYZED<br>  TCP_ID = Info-analyzed (e4)<br>  CS_ID = Call-Segment-ID<br>  •<br>  •<br>  • |
| 12: 01: 00: 25 | TO: ASC-SWITCH-ID | SEND_TO_RESOURCE<br>  CS_ID = Call-Segment-ID<br>  •<br>  •<br>  •<br>  Resc_Type = ANNOUNCEMENT<br>  Send_to_Rese_Param_Blk = #67 |
| 12: 01: 00: 05 | FROM: ASC-SWITCH-ID | RESOURCE_CLEAR<br>  TCP_ID = Call-Presented (e20)<br>  CS_ID = Call-Segment-ID<br>  •<br>  •<br>  •<br>  Error_Code = ANNOUNCEMENT FAILED |

FIG. 9B

| EXPECTED CALL HISTORY LOG: SCP | | |
|---|---|---|
| TIME | SOURCE DESTINATION | MESSAGE |
| 12: 01: 00: 03 | FROM: ASC-SWITCH-ID | INFO_ANALYZED<br>  TCP_ID = Info-analyzed (e4)<br>  CS_ID = Call-Segment-ID<br>  •<br>  •<br>  • |
| Min:<br>12: 01: 00: 18<br>Max:<br>12: 01: 01: 03 | TO: ASC-SWITCH-ID | SEND_TO_RESOURCE<br>  CS_ID = Call-Segment-ID<br>  •<br>  •<br>  •<br>  Resc_Type = ANNOUNCEMENT<br>  Send_to_Rese_Param_Blk = #175 |
| Min:<br>12: 01: 00: 33<br>Max:<br>12: 01: 10: 48 | FROM: ASC-SWITCH-ID | RESOURCE_CLEAR<br>  TCP_ID = Call-Presented (e20)<br>  CS_ID = Call-Segment-ID<br>  •<br>  •<br>  •<br>  Error_Code = NULL |

*FIG. 9C*

| TIME | SOURCE DESTINATION | MESSAGE |
|---|---|---|
| WEIGHTED CALL HISTORY LOG: SCP | | |
| ACTUAL:<br>12: 01: 00: 03 | FROM: ASC-SWITCH-ID | INFO_ANALYZED<br>TCP_ID = Info-analyzed (e4)<br>CS_ID = Call-Segment-ID<br>• <br>• |
| Min Δ:<br>00: 00: 00: 07<br>Actual:<br>12: 01: 00: 25<br>Max Δ:<br>0: 00: 00: 38 | TO: ASC-SWITCH-ID | SEND_TO_RESOURCE<br>CS_ID = Call-Segment-ID<br>• <br>• <br>Resc_Type = ANNOUNCEMENT<br>Send_to_Rese_Param_Blk = #67 |
| Min Δ:<br>00: 00: 00: 28<br>Actual:<br>12: 01: 00: 05<br>Max Δ:<br>0: 00: 10: 43 | FROM: ASC-SWITCH-ID | RESOURCE_CLEAR<br>TCP_ID = Call-Presented (e20)<br>CS_ID = Call-Segment-ID<br>• <br>• <br>Error_Code = Announcement failed |

TESTING OF DISTRIBUTED COMMUNICATIONS NETWORKS

FIELD OF INVENTION

This invention relates to a method and system for testing and sectionalizing network problems within a distributed network and, specifically, troubles within an advanced intelligent network.

BACKGROUND OF THE INVENTION

Traditionally, the primary objective of testing systems for communications networks, such as telephony networks, was to verify the integrity and continuity of transport facilities and functions. For example, loop test systems for plain-old-telephone-service are used to make a large number of electrical measurements (e.g., D.C. voltage, A.C. impedance, etc.), perform an extensive analysis of those measurements, and provide an interpretation of those measurements as to whether a subscriber's loop is normal, open, shorted, etc. Also, systems for testing digital networks (e.g. Digital Data System Services (DDS) Integrated Services Digital Network (ISDN)) may entail insertion of a pseudorandom digital data sequence at one access point in the network and analysis of the received sequence for errors when the network is monitored at a second access point.

In traditional communications networks, there were typically limited service offerings, which required only basic processing. Furthermore, service processing typically invoked functions which were centrally located at network nodes. By having processing functions centrally located, testing of processing functions by a craftperson was relatively simple. Given the simplicity of service processing and the fact that processing functions were centrally located, testing of processing functions was not a significant challenge.

With the increased service offerings and complexity of present day communications networks, testing needs have expanded beyond merely testing of transport facilities between network nodes, particularly, in distributed networks. In distributed networks, such as the Advanced Intelligent Network (AIN), service processing functions and operations are geographically distributed at multiple nodes throughout the network. Furthermore, subscriber- and service-specific logic and data, which are invoked by service processing nodes, may also be stored at locations that are geographically distinct from the locations of various processing nodes. Therefore, testing needs of present-day distributed networks, such as AIN service, include not only transport, but also call processing nodes, which are geographically distributed and dependent on subscriber-specific as well as service-specific data. While traditional testing systems for loops, trunks, and signaling links may still be useful for verification of the continuity and integrity of transport facilities and functions of distributed network, testing of service processing in a distributed network has become a challenge.

An approach to testing service processing in a distributed network is to dispatch craft personnel to each processing element or node invoked in providing service to a subscriber and to conduct isolated tests of each node individually. However, this approach could be very labor-intensive, time-consuming, and cost-prohibitive, especially where multiple network nodes are involved, since testing at all nodes may entail the cooperation and coordination of a team of craftpersons. Another drawback is that test results may be disjointed since overall test results are based upon data collected from isolated, unrelated tests conducted at each individual node.

To gain an accurate and continuous view of service processing over a subscriber's line, another approach to testing may be for craft personnel to gain physical access to the subscriber's line and to test the line directly. However, a drawback of this approach is that physical access to the subscriber's communication line may be difficult during normal business hours when non-business subscriber's are most likely to be unavailable. Furthermore, this approach will cause the subscriber's service to be interrupted during testing. In addition, under this approach, verification of service troubles may only be permitted; however, absent the capability to collect test data from individual network nodes, sectionalization of service trouble to particular network nodes may not be possible.

To effectively test for service trouble in a distributed network such as AIN, the following test capability may be needed:

1) To verify service and sectionalize trouble in an economical and timely manner;
2) To test a subscriber's service from the subscriber's perspective without having physical access to the subscriber's line;
3) [missing]
4) To generate an end-to-end view of service processing;
5) To log activity between network nodes; and
6) to retrieve logged activity related to service processing for sectionalizing trouble in the network.

SUMMARY OF THE INVENTION

In view of the shortcomings of various prior approaches to testing distributed networks and the above-mentioned capabilities needed for testing distributed networks, an object of our invention is to enable testing of subscriber' services and sectionalizing trouble in distributed networks, such as Advanced Intelligent Network (AIN). Specifically, our inventive testing system and method include a test call set-up component which enables a tester to place a test call emulating a call from a subscriber's line. The subscriber' line may be the tester's own communication line or another subscriber's communication line. Our inventive system and method also allows a test call to be set up by designating certain calls originating from the subscriber's line or initiated by the network for the subscriber as test calls. During test call set-up, a maintenance parameter is established, which defines the environment in which a test call is to be processed (such as the time of day, the long-haul carrier, etc.) and the data to be collected, if any, during the test call is also indicated.

Our testing system and method also include a call history log component embedded at network nodes throughout the network. These components are used to activate the collection of actual data associated with the processing of a test call at network nodes in the form of an actual call history logs. This component also provides a mechanism for the tester to retrieve call history logs associated with a particular test call. Another aspect of the call history log component is the capability to generate for each network node processing the test call an expected call history log, which approximates the data that would be expected under normal operating conditions.

The type of data to be collected as well as other aspects of the call history log can be controlled by the tester during set-up of the test call when defining the maintenance parameter. The actual call history log generated at each processing node can be retrieved and used by the tester to provide a continuous end-to-end view of service processing of the test call placed from the point of view of a subscriber's communication line.

Our testing system and method minimize the expense of and need to test, individually and iteratively, all network nodes invoked in providing a service to a subscriber. Also, our testing system and method obviate the unreliability of disjointed sectionalization data collected through a conventional node-by-node testing approach, by obtaining an end-to-end view of call processing activity at each processing node while a test call is in progress. By giving the tester control of the test environment, the test call can be placed under conditions emulating the environment of the subscriber's line. As a result, data depicting call processing activity at various nodes is generated for more accurate and timely testing, sectionalization and repair of network troubles.

Another outstanding feature of our testing system and method is that remote testing of a subscriber's communications service is permitted without requiring physical access to the subscriber's communication line and without disrupting the subscriber's service. By generating call history logs of actual and expected call processing data, a tester can compare actual and expected data for each network node and also examine the flow of call processing from one node to another for easier sectionalization of trouble.

BRIEF DESCRIPTION OF THE DRAWING

FIGS. 9a and 9b illustrate an actual C-Log and an expected C-Log, respectively, in accordance with an aspect of our invention.

FIG. 9c illustrates a display of a weighted comparison of an actual C-Log and an expected C-Log in accordance with an aspect of our invention.

DETAILED DESCRIPTION

Our inventive system and method for testing distributed networks is presented by initially describing, illustratively, an architectural environment in which to implement our testing system and method, namely Advanced Intelligent Network (AIN). Background information on AIN is described in Section A. An overview of our testing system and method is provided in Section B followed by a discussion of the components comprising our testing system (Sections B1–B5). Lastly, to demonstrate the implementation of our testing system and method in a distributed network, an illustrative example is provided in Section C, which describes testing of a subscriber's speed calling automatic update service.

A. Advanced Intelligent Network (AIN)

Many distributed network architectures providing services to subscribers can gracefully implement our inventive test system and method to test services and sectionalize trouble within the network. For the purpose of a specific illustrative example, the network architecture employed for implementing our inventive test system and method is the Advanced Intelligent Network (AIN).

The object of AIN is to create a programmable service-independent environment having standard interfaces and being compatible with multi-vendor' equipment such that network service providers can quickly respond to customer needs and market opportunities. Details of AIN are provided in "Advanced Intelligent Network Release 1 Network and Operations Plan", Special Report, SR-NPL-001623, Issue 1, June 1990, published by Bell Communications Research.

Figure 1:
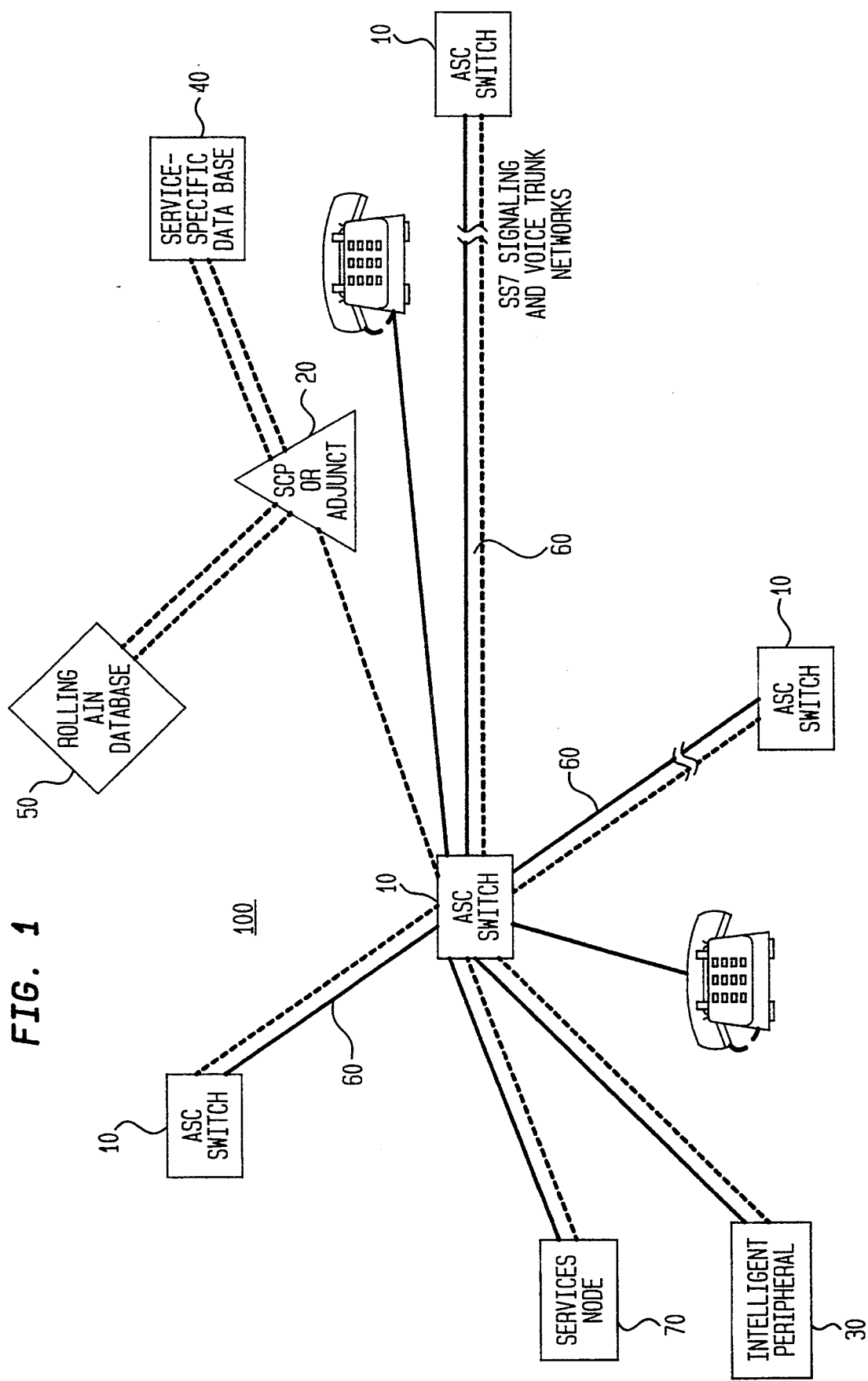
FIG. 1 shows the Advanced Intelligent Network (AIN), a distributed network in which our invention may be employed.

As shown in FIG. 1, AIN is a distributed network having multiple network nodes that are utilized to provide service processing for a subscriber. Specifically, AIN includes an ASC switch 10 having AIN Switch Capabilities (ASC), a Service Control Point (SCP) or Adjunct System 20, an Intelligent Peripheral (IP) 30, a service-specific data base 40, a services node (SN) 70, and a rolling AIN data base 50. The AIN network 100 is comprised of multiple ASC switches 10 interconnected by signaling and voice trunk networks 60. As shown in FIG. 1, signaling communication between ASC switches is provided by Signaling System Number 7 (SS7), a protocol and network for exchanging signaling information between nodes over data links that can be separate from voice paths. For more information on SS7 and similar networks, see *Common Channel Signaling 7 Information Guide*, 256-002-100, AT&T Network Systems, Issue 2, June 1988. Information between ASC switches 10 may be transported in user definable maintenance attributes in the SS7 ISDN user protocol.

The ASC switch 10 is a hub of the AIN architecture and may be any stored program control switching system containing ASC functionality. ASC functionality enables the switch to detect calls warranting AIN service processing based upon pre-determined triggers which may involve the exchange of information with the SCP or adjunct system 20, the IP 30, and data bases 40, 50 before resuming normal call processing when service processing is completed. The set of triggers which defines when the ASC switch 10 will query the SCP or adjunct 20 for information on call processing subscriber is called the subscriber's trigger criteria.

The ASC switch 10 identifies calls requiring service logic to be executed in order to be routed and processed and initiates dialogue with the SCP or Adjunct System 20 which contains service logic programs (SLPs). Upon receiving instructions resulting from the execution of an SLP 25 at the SCP or Adjunct system 20, the ASC switch 10 responds to the instructions and processes the call accordingly.

The SCP or Adjunct System 20 is the "smart node" in AIN containing service logic for processing calls. The SCP 20 communicates with the ASC switch 10 via the SS7 network, which is described above. In lieu of an SCP 20, an Adjunct System could be employed which is functionally equivalent to an SCP 20, but which does not require SS7 to communicate with the ASC switch 10. Instead, a high speed interface can be used to support communication between the ASC switch 10 and the Adjunct System. For purposes of discussion and illustration herein, an SCP 20 is employed in the AIN network 100 in lieu of an Adjunct System.

Another element of the AIN network 100, which is connected to the ASC switch 10, is the Intelligent Peripheral (IP) 30. The IP 30 can serve as a resource to the ASC switch 10 in many different capacities by providing functions such as collection of Dial Tone MultiFrequency (DTMF) digits, playing network announcements, and voice recognition. For the purposes of this discussion, the IP 30 provides customized voice announcements. For example, the IP 30 may be accessed via the ASC switch 10 when a voice announcement is to be played for the tester to request information to set-up a test call, or for a calling party to inform him that the directory number of the called party is no longer in service. The services node (SN) 70 may contain IP 30 functions combined with service logic programming functions similar to that found in SCP 20.

Also included in the AIN network 100 are the service-specific data base 40 and the rolling AIN data base 50. The service-specific data base 40 may store service-specific and subscriber specific data and logic needed to support service processing. For example, a speed calling data base stores actual directory numbers represented by abbreviated numbers that are pre-selected and entered by speed calling service subscribers. Each subscriber is designated a portion of the speed calling database for storing his or her directory numbers and corresponding abbreviated numbers. A call forwarding data base may store destination numbers to which a subscriber's calls are to be transferred when call forwarding is activated by the subscriber.

The rolling AIN data base 50 stores changed information on a temporary basis. For example, the rolling AIN data base 50 could store recently changed numbers (outdated numbers with their corresponding updated numbers). This data base could be queried when the directory number of the called party is identified at the ASC switch 10 as being non-working or out of service.

B. Overview of Testing Method and System

Figure 2:
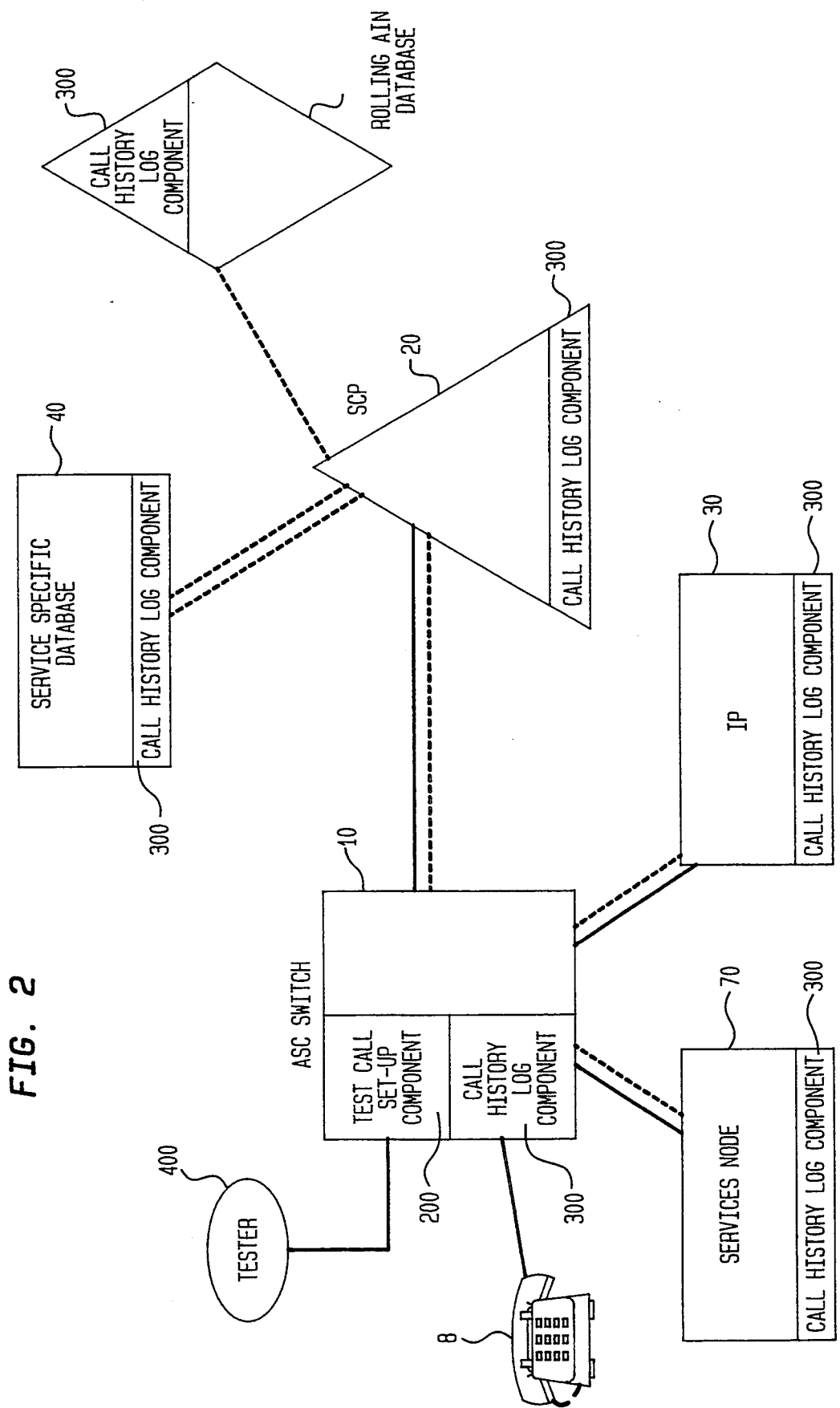
FIG. 2 depicts the components of our inventive testing system in accordance with an aspect of our invention.
Figure 3:
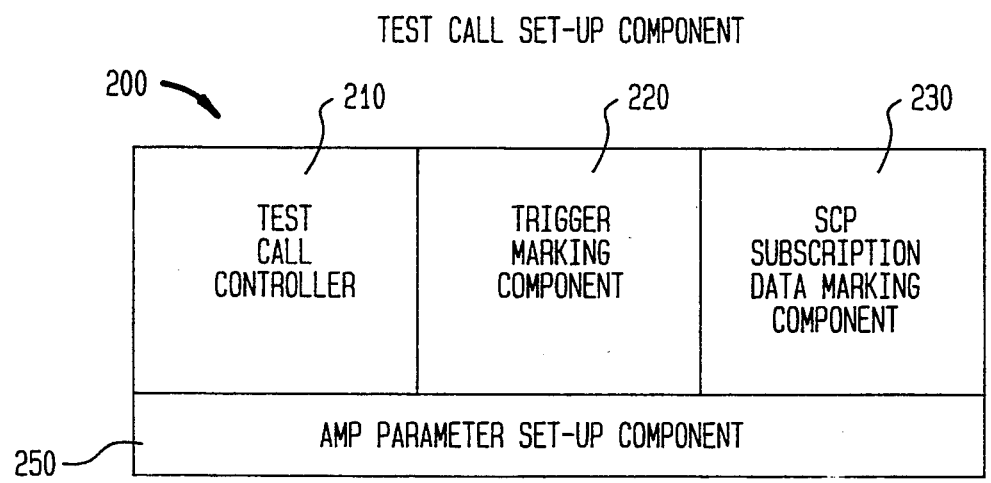
FIG. 3 depicts the components of the Test Call Set-Up Component in accordance with an aspect of our invention.

Our inventive testing system and method allows a tester to verify trouble and sectionalize failures in a distributed network, such as the advanced intelligent network (AIN) discussed previously in Section A. A tester could be a person who interacts with the network using a "touch-tone" telephone via one or more network operations systems, or an automated testing network operation system requiring little human intervention. As shown in FIG. 2, our testing system is comprised of a test call set-up component 200, and a call history log component 300. As shown in FIG. 3, our testing call set-up component provides three different options for setting up a test call which include using a test call controller, marking a trigger in a subscriber's trigger criteria, or marking subscription data which is accessed during a network-initiated call.

A tester can set-up a remote test by using the test call controller 210. The test call controller 210 supports service testing on a subscriber's line by allowing the tester to interactively define the environment under which the call is to be placed, the subscriber's directory number, and the directory number of the called party. The information provided by the tester is encoded in the AIN maintenance (AMP) parameter using the AMP parameter set-up component 250. The AMP parameter is to be used by network nodes to process the test call. Therefore, the test call will emulate a call originating from the subscriber's line under the environmental conditions defined by the tester, the subscriber's trigger criteria, and subscriber-specific data and logic.

Test calls may also be set up by marking triggers in a subscriber's trigger criteria with an AMP parameter by invoking the trigger marking component 220. When a call is placed from the subscriber's line and a marked trigger is activated, message relating to the call are appended with the AMP parameter and treated as a test call. Similarly, a test call can be set-up by marking a subscriber's subscription data at the SCP 20 with an AMP parameter by invoking the subscription data marking component 230. Therefore, when a network-initiated call is placed which accesses the marked subscription data, messages relating to the call are appended with the AMP parameter and treated as a test call.

Figure 4:
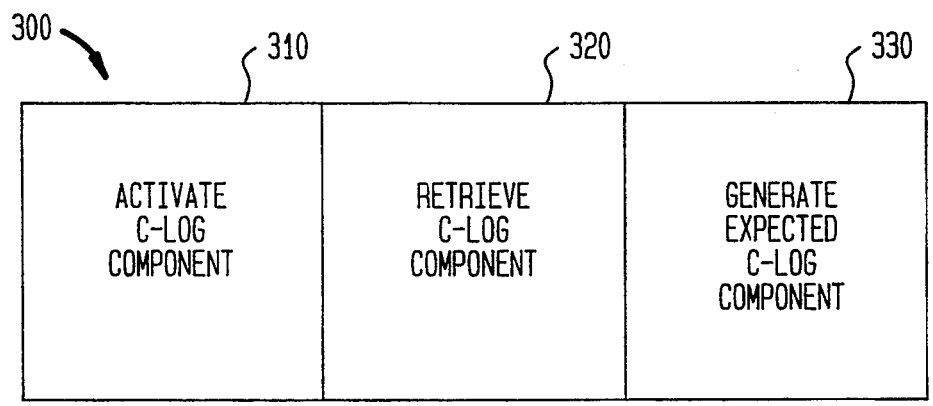
FIG. 4 depicts the components of the Call History Log Component in accordance with an aspect of our invention.

If the tester wishes to have data collected which reflects the processing activity of the test call at various nodes throughout the network, the call history log component 300 can be utilized, as shown in FIG. 4. The call history log component 300 is comprised of an activation component 310, a retrieval component 320, and a generate expected log component 330. These components may be located at geographically distinct locations and may operate independently of one another.

The collection of call processing activity for a test call can be activated when defining the attribute of the maintenance parameter during test call set-up using the activation component 310. Once processing data for the test call has been collected and stored, the call history logs generated at each network node for the test call can be retrieved by the tester using the retrieval component 320 by inputting the corresponding identification number. To assist the tester in sectionalizing trouble in the network with accuracy and timeliness, an expected call history log can be generated for each network node involved in processing the test call using the generate expected log component 330. In addition, a weighted comparison of the difference between the actual and expected call history log data for each network node can be generated to assist the tester in sectionalizing trouble in the network. It should be noted that, the test call set-up component 200 and call history log component 300 of our testing system may be used independently of one another or together depending upon the level and strategy of testing sought by the tester.

B1. Test Call Set-Up Using Test Call Controller

Figure 5:
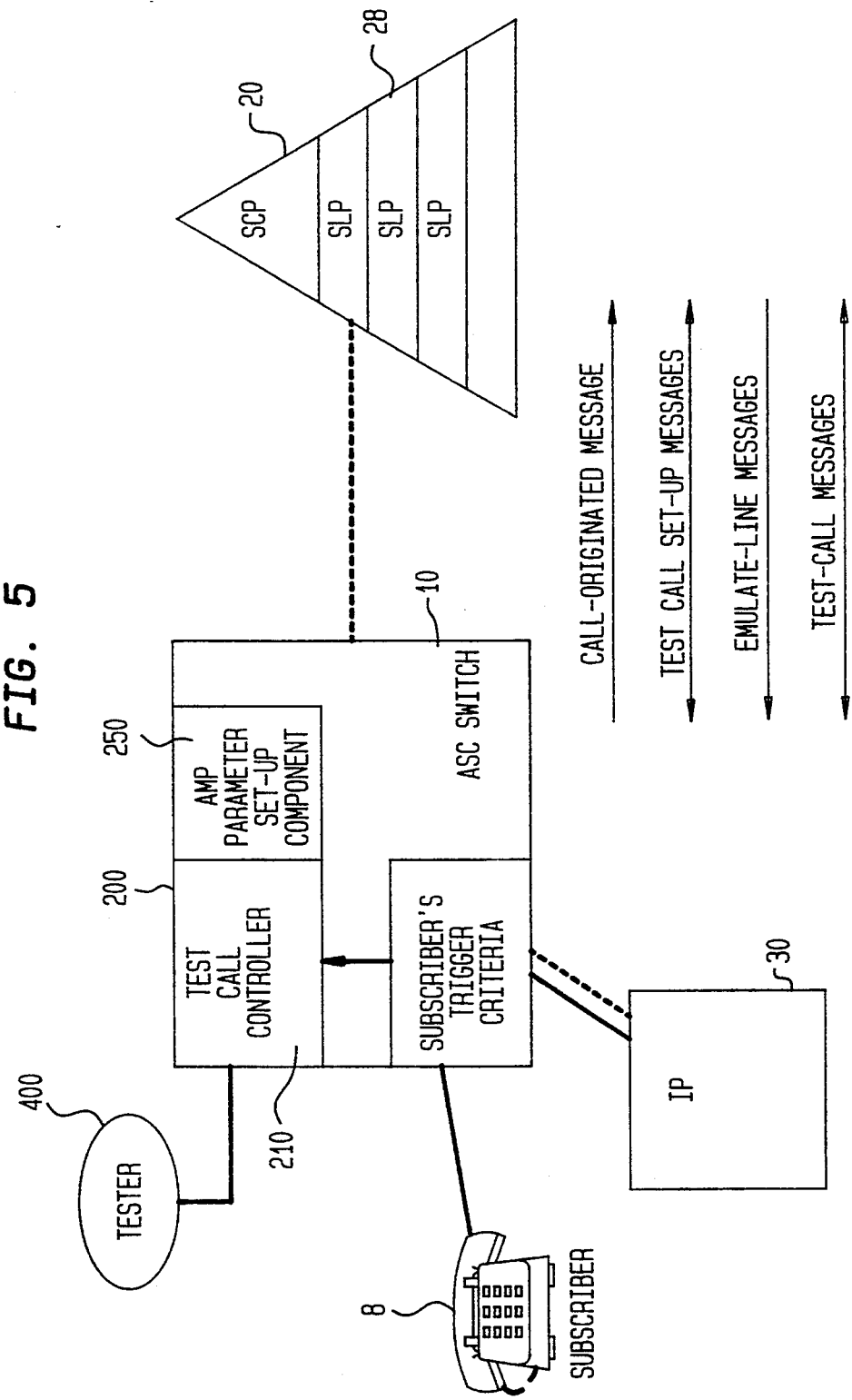
FIG. 5 depicts the use of the test call controller to set-up a test call emulating a call from a subscriber's line in accordance with an aspect of our invention.

As shown in FIG. 5, the test call controller 210 enables a tester to originate a test call from the ASC switch 10 wherein the test call emulates a call from a subscriber's line 8 served by the ASC switch 10. The test call controller 210 serves as an interface between the tester 400 and the ASC switch 10 during set-up of a test call and processing of the test call. In our illustrative system, the test call controller was arranged to specifically allow services provided on analog access lines served by the A SC switch 10 to be tested by a test call; however, the test call controller 210 may be adaptable to testing services provided on digital access lines.

To place a test call, a tester 400 dials up the directory number associated with the test call controller 210. In response to receiving the call, a trigger at the test call controller 210 is activated causing the ASC switch 10 to launch a "Call-Originated" message to the SCP 20 to execute the test call service logic program (SLP) 28. This SLP 28 controls the playing of various announcements from the IP 30 to the tester 400 via the test call controller 210. These announcements are in the form of requests to the tester 400 for information to set-up the test call.

A first request made to the tester 400 could be for the tester's security access code, which is used to verify that the tester is authorized to originate test calls. Once the tester's access authorization is verified, other information relating to set-up of the test call is similarly requested through announcements from the IP 30. Other requested information might include the directory number of the subscriber's line to be emulated when placing the test call, the time of day and the day of the week to be emulated, and other information to establish the test call environment. Other information requested during test call set-up will be discussed in more detail in Section B4 which describes the AMP parameter.

Once receiving the information needed to set-up the test call, the test call SLP 28 sends an "Emulate-Line" message to the ASC switch 10, which contains the information requested from the subscriber. This information is then encoded at the AMP parameter set-up component (FIG. 5) into an AIN Maintenance Parameter (AMP), which is appended to each test call message routed in the network. The AMP parameter will be used at networks nodes 10 to control various aspects of the processing and data collection for the test call and will be appended to messages emanating from nodes involving the processing of the test call. More details on the purpose and contents of the AMP parameter are discussed in Section B4.

After set-up is complete, the ASC switch 10 can place a test call as if it were any normal call originating from the subscriber's line. The test call will originate from the ASC switch 10 and will be based upon the environment defined by the tester during set-up of the test call, the subscriber's trigger criteria, and other subscriber-specific data and logic associated with the subscriber's line. To notify the tester 400 that a test call can be placed, the ASC switch 10 may send dial tone (off-hook signal) to the tester 400. However, if the subscriber, whose line is being emulated, has an off-hook-related trigger, there are a number of other possible signals that the network may return to notify the tester. For example, the signal may be a special audible tone or an announcement from the IP 30 (FIG. 2). Illustratively, this signal serves as the tester's notification to dial the directory number of the called party.

At this point, the test call controller 210 may enter a quiescent state while the tester interacts with the network. During the processing of the test call, the tester 400 can monitor and evaluate the progress of the test call by listening, and manually entering additional dialed-digits as needed.

B2. Test Call Set-Up by Marking Triggers

Figure 6:
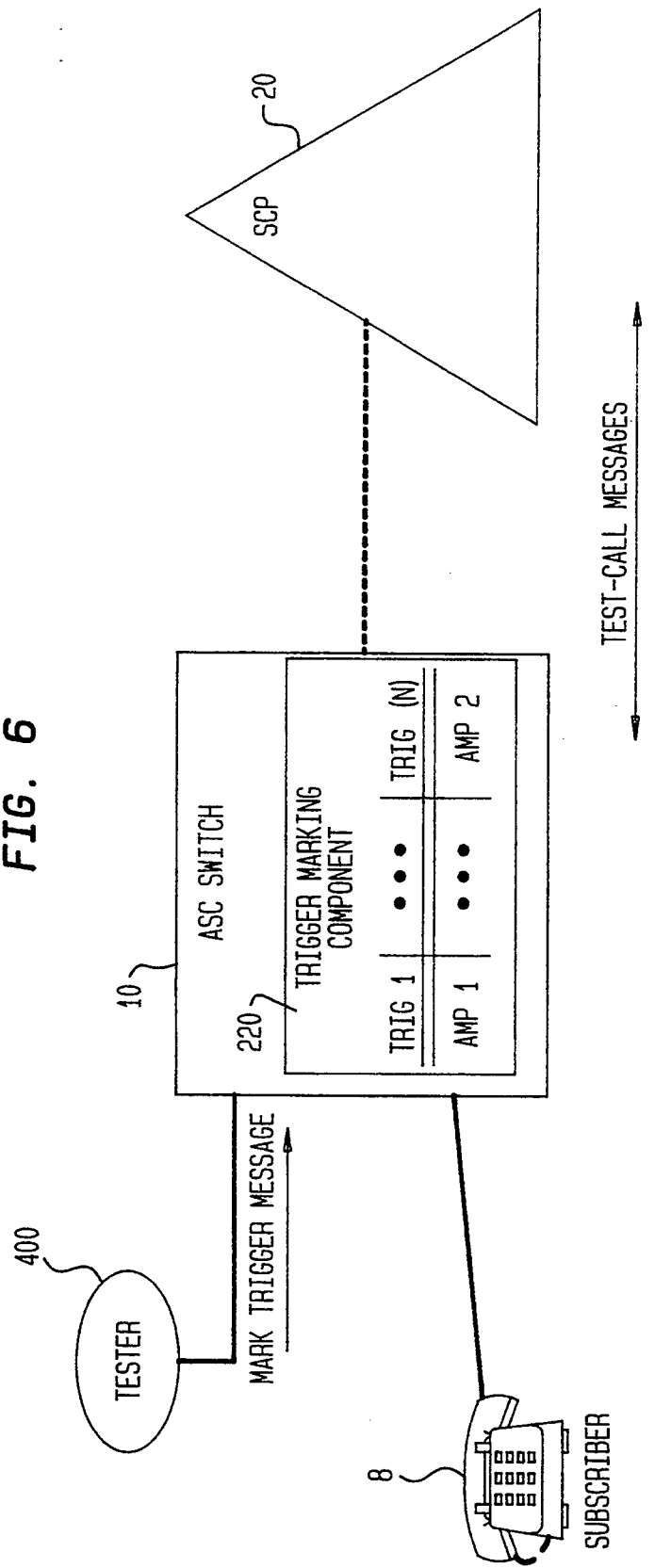
FIG. 6 illustrates the use of the trigger marking component to set up a test call in accordance with an aspect of our invention.

In addition to the capability to remotely test a subscriber's line by emulating a call originating from the subscriber's line, our inventive method and system also allow a subscriber's line to be tested directly by designating certain calls originating from the subscriber's line as test calls. As shown in FIG. 6, designating calls as test calls can be accomplished by marking select triggers in a subscriber's trigger criteria with an AMP parameter using the trigger marking component 220. Triggers may be marked for calls that either originate from or terminate at the A SC switch 10.

A tester may mark triggers by sending a message to the ASC switch 10 using either a local administrative terminal or a remotely located memory administration system (not shown) requesting that the switch mark the particular trigger(s) in the subscriber's trigger criteria with the AMP parameter. Then, whenever the subscriber's marked trigger is activated, the query sent from the ASC switch 10 to the SCP 20 will have the AMP parameter appended to it. Furthermore, messages sent between network nodes related to the call will be appended with the AMP parameter. The presence of AMP parameter appended to messages relating to the test call alerts other network nodes processing the call to treat it as a test call.

In an illustrative embodiment of our invention, this approach could be used to set-up test calls for analog lines or digital lines (such as integrated services, digital network (ISDN)). For example, under this test call set-up approach, testers attempting to sectionalize trouble reported for an AIN service on a subscriber's ISDN line can mark triggers within the subscriber's trigger criteria with AMP parameters to designate particular ISDN calls invoking the AIN service as a test call. When the subscriber places an ISDN call and the marked trigger is activated, messages relating to the call are appended with the AMP parameter, and data relating to call processing can be logged at various network nodes as indicated in the AMP parameter as discussed in Section B1.

In lieu of waiting for the subscriber to place an ISDN call activating a marked trigger, a tester may request that maintenance personnel gain access to the subscriber's line and place calls which specifically activate triggers that have been marked. Alternately, where loop testing is supported, the tester may use an embedded loop testing system call function to originate a call from the subscriber's line. However, when personnel or the loop testing system place a call on the subscriber's line, service to the subscriber may be interrupted.

Test call set up using the trigger marking component 220 provides the tester 400 with an alternate means to originate test calls without using the test call controller 210. Testing remotely using the test call controller would be advantageous in some cases since service to the subscriber is not interrupted and intervention of on-site maintenance personnel is not required. However, designating calls originating from the subscriber's line as test calls allows for accurate data collection and sectionalization of trouble when the A SC switch is not equipped with the test call controller component.

B3. Test Call Set-Up by Marking SCP Subscription Data

Some services provided to a subscriber cannot be tested by emulating a call from the subscriber's line as suggested in Section B1, nor does the service involve the activation of triggers in the subscriber's trigger criteria. For example, a wake-up service entails a network-initiated call being placed to a subscriber and an announcement being played at a time pre-specified by the subscriber. In this instance, the wake-up call is initiated by the network, not by a call from the subscriber's line or a trigger being activated in the subscriber's trigger criteria. To allow testing of network-initiated services, our test call set-up component 200 provides for test call set-up by using the subscription data marking component 230 (FIG. 3).

Network-initiated calls are generally handled in the following manner. The first message involving the call originates from the SCP 20 based upon the subscriber's subscription data stored there and is sent to the ASC switch 10. For example, for wake-up service, service logic in the SCP 20 may administer a list of customers subscribing to the service who want to be awakened by a call at 8:00 AM. When 8:00 AM arrives, the service logic automatically sends a "Create-Call" message to the ASC switch 10 which, in turn, rings the subscriber line and plays a wake-up announcement.

Figure 7:
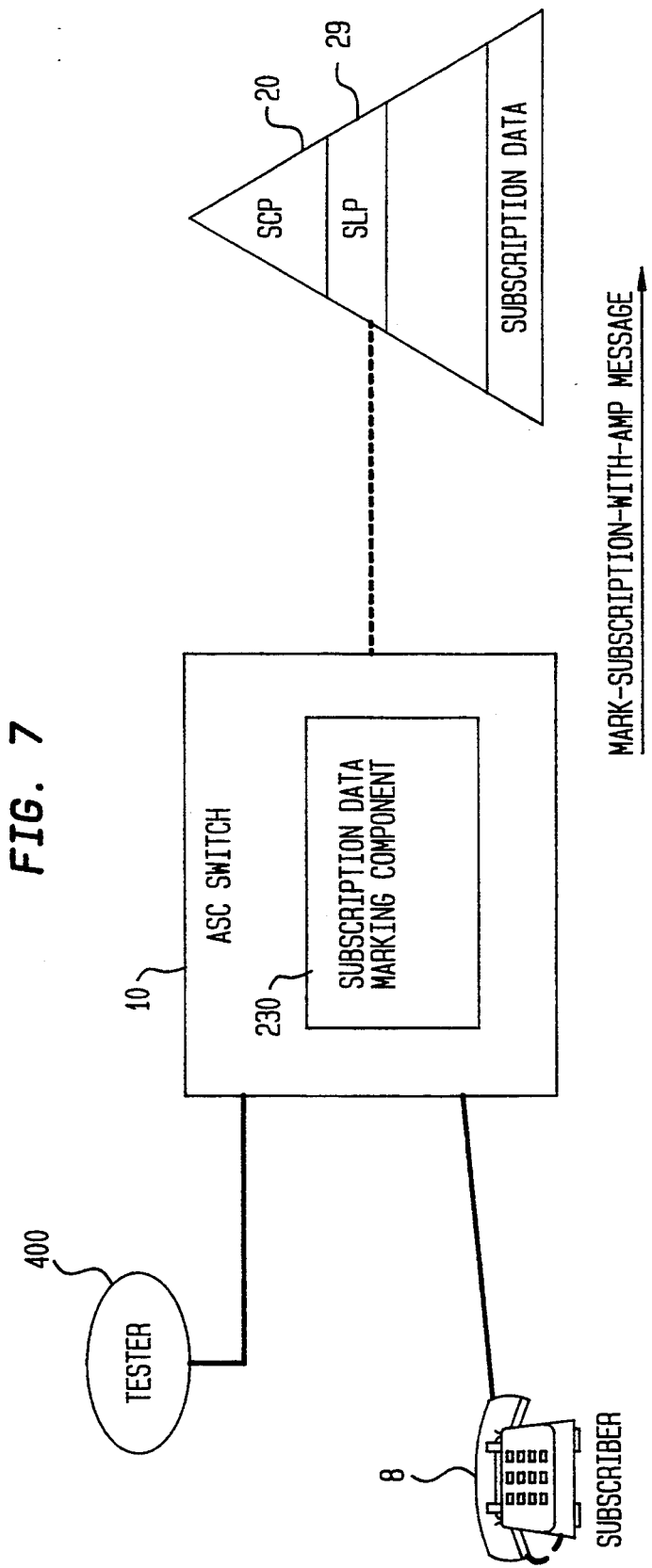
FIG. 7 demonstrates the use of the subscription data marking component at the service control point (SCP) to set-up a test call in accordance with an aspect of our invention.

To test network-initiated services, network-initiated calls can be marked as test calls. As shown in FIG. 7, to mark network-initiated calls, the subscriber subscription data in the SCP 20 is marked with an AMP parameter. This is done when the tester 400 causes a "Mark-Subscription-with-AMP" message to be sent via the subscription data marking component 230 of the ASC switch 10 to the SCP 20. Alternatively, the tester could send a message directly to the SCP 20 asking that the AMP parameter be appended to the subscriber's subscription data.

At the SCP 20, a service logic program SLP 29 may be executed to mark this data. This program would interact with tester 400 to collect the data needed to define the AMP parameter. The program would cause the subscriber's subscription data to be marked with the AMP parameter defined by the tester 400.

When the network initiates a wake-up call which accesses marked subscription data, the call is recognized as a test call and the AMP parameter is appended to any outgoing messages (e.g., the "Create-Call" message in the above example) resulting from the network-initiated call. Therefore, all nodes involved in the processing of the wake-up call can similarly identify it as a test call.

B4. AIN Maintenance Parameter (AMP)

As previously discussed, an AMP parameter contains information to be used by network nodes to control various aspects of the processing of the test call and data logging to be conducted for the test call. This parameter is generated using the AMP parameter set-up component 250 (FIG. 3). When testing using the test call controller 210 as discussed in Section B1, the AMP parameter is established during test call set-up by querying the tester 400. If test calls are set up using the trigger marking component 220, as described in Section B2, the AMP parameter is established when marking certain triggers. When setting up test calls using the subscription data marking component 230, the AMP parameter is established at the time the subscription data is marked.

Upon receiving a test call, network nodes process the test call and logs call processing data based upon instructions and information contained in the AMP parameter. For purposes of this discussion, we assume that the network nodes in the AIN as well as any distributed network employing our inventive system and method have the capability to receive and identify the AMP parameter, and use this parameter to control call processing as part of the operations functionality built into service logic when a service is first created.

The AMP parameter has a number of attributes that can be defined by the tester to control various aspects of the test call. These attributes may include:

AMP-AMA-Treatment
AMP-Billing Treatment
AMP-Time
AMP-Environmental-Change
AMP-Do-Not-Alert
AMP-Announcement-Call-Processing
AMP-Sequence
AMP-Reserved
AMP-C-Log The AMP-AMA-Treatment attribute defines how records should be marked for the purpose of the test call (e.g., "test call" or "subscriber line usage study"). The AMP-Billing-Treatment attribute can be set to define how billing records should be marked for the test call (e.g., billable or nonbillable).

The AMP-Time attribute, if set, carries the time-of-day, day-of-week, etc., that service logic should use when processing the test call. Sub-attributes of the AMP-Time attribute might include:

amp-Time-Year
amp-Time-Month
amp-Time-Date
amp-Time-Hour
amp-Time-Minute

The AMP-Environmental-Change attribute, if set, will cause an announcements to be played requesting from the tester information on environmental changes before processing the test call (e.g., new time of day, new day of the week, etc.). The AMP-Do-Not-Alert attribute, if set, notifies service logic to complete the test call up to, but not including, alerting the called party.

The AMP-C-Log attribute, which may be comprised of multiple sub-attributes, defines information needed to generate a call history log (C-Log) at network nodes. The sub-attributes of the AMP may include:

AMP-C-Log-Id
AMP-C-Log-Level

The AMP-C-Log-Id is an identification number for the C-Log in which each network node will save data relating to a particular test call. Typically, this identification number is set by the ASC switch and will be the identification number of the ASC switch placing the test call combined with a unique number string assigned during test call set-up. Other sub-attributes indicating the network nodes which are to collect test call processing data or specifying the type messages to be collected at various processing nodes may also be included in the AMP-C-Log attribute.

The AMP-C-Log-Level attribute defines the type of data to be collected during the test call. Since the AMP parameter is passed to every other network node involved in the call (such as other AIN switches, SCPs, IPs, etc.), each node may save its view of test call processing so that the tester can re-construct a network-wide view of the complete test call processing.

The AMP-Sequence attribute is used to capture the sequence in which network nodes process the test call. The AMP-sequence is incremented upon receipt by each network node that logs test call data, thereby making the processing sequence more readily apparent to the tester when reviewing the processing data. This AMP-Announce-Call-Processing attribute can be used to play announcements to the tester reporting on the status of test call processing (e.g., "successfully read subscriber record data", "switch query response timed-out", etc.). These announcements must be provisioned in the appropriate IP when the service under test is first deployed. Another attribute of the AMP is the AMP-Reserved which can be used for multiple miscellaneous purposes defined by the network.

Default levels for any of these attributes may be pre-defined by the network which would be in effect if not overridden by the tester during test call set-up. The above list of AMP attributes is presented to suggest the various types of information that could be included in the AMP parameter. Any subset, combination, or extension of these attributes could be part of the AMP parameter depending upon the various factors, such as the services being tested, desired logging capabilities, constraints imposed by the network.

B5. Call History Log (C-Log) Component

Setting the AMP-C-Log attributes of the AMP parameter to appropriate levels, the tester involves our inventive call history log (C-Log) component 300 (FIG. 2). By activating the C-Log component 300, information on processing activity relating to particular test calls can be saved in the form of call history logs. By facilitating the retrieval of C-Logs generated at various network nodes for a particular test call, this component allows a tester 400 to gain an end-to-end view of the call processing activity for the test call. Furthermore, to aid the tester in determining the correctness of each C-Log collected from various network nodes and in sectionalizing network trouble, our C-Log component 300 includes the capability to generate expected C-Logs.

Our inventive call history log component is comprised of the following components as shown in FIG. 4: Activate C-Log Component 310, Retrieve C-Log Component 320, and Generate Expected C-Log Component 330. These functions are discussed individually and in more detail below.

Activate C-Log Component

The activate C-Log component 310 can be employed to set up conditions in the network to enable the collection of processing data at various network nodes involved in test call processing. A tester may activate a C-Log for test calls initiated by using the test call controller 210, the trigger marking component 220 or the subscription data marking component 230. Under any of these approaches, a tester can request the collection of a C-Log by setting the AMP-C-Log attribute appropriately during test call set-up. AMP-C-Log attributes (AMP-C-Log-Level and AMP-C-LOG-Id) inform the network nodes of the type processing data to be collected, if any, for the test call and the identification number assigned to the C-Log to be generated.

Figure 8:
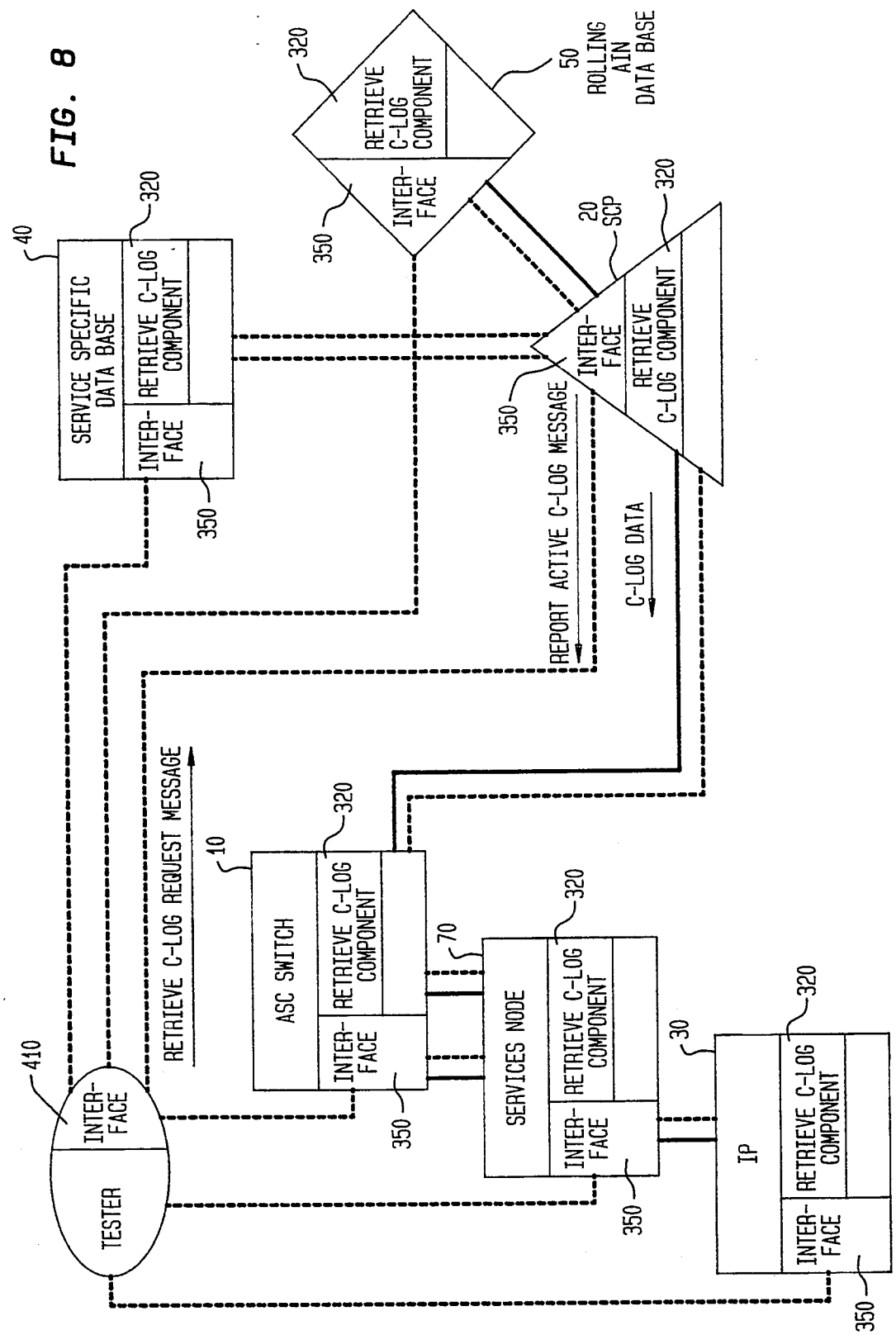
FIG. 8 depicts the retrieval of C-Logs from individual network nodes to the tester using the retrieve C-Log component in accordance with an aspect of our invention.

Once the AMP-C-Log attributes have been appropriately set and a test call is placed, the switch appends the AMP parameter to the test call. Since the AMP parameter indicating the type of C-Log data to be collected is appended to the messages relating to the test call, network nodes involved in processing of the test call will collect C-Log data as instructed in the AMP-C-Log attributes and will identify the C-Log being generated by the AMP-C-LOG-Id. Whenever a network node receives a message containing an AMP parameter and creates a new C-Log, the node sends a "Report-Active-C-Log" message via the node interface 350 to the tester directly via the tester interface 410 as shown in FIG. 8 to advise the tester that a new C-Log has been initiated and of its C-Log identification number.

Since the tester is advised by the network nodes that it is processing the call and collecting processing activity data, the tester need not know in advance which network nodes will be processing the call. This feature is important because the network nodes involved in call processing for a particular subscriber service may vary depending upon traffic conditions, the service, and other factors; therefore, this feature allows the tester to know which network nodes were actually involved in the processing of the test call to facilitate the retrieval of C-Log data.

Retrieve C-Log Component

When a test call is completed, the tester can retrieve C-Logs that were generated at each network node by invoking the retrieve C-Log component. Upon receiving from the tester 400 "Retrieve C-Log Request" message which includes the C-Log identification number corresponding to the test call, the retrieve C-Log component at each network node forwards a copy of its C-Log to the tester directly as indicated in FIG. 8 via interfaces 350 and 410; however, the C-Log data may be retained at its respective network node until the tester sends a message to the Retrieve C-Log component to have the C-Log deleted. It should be noted that a C-Log generated at a network node during actual processing of a test call is referred to as an actual C-Log as distinguished from the expected C-Log discussed below. An illustrative example of an actual C-Log generated at a SCP during processing of a test call is shown in FIG. 9a.

Generate Expected C-Log Component

Testers having retrieved C-Log data collected by network nodes during a test call may use this data to observe how the test call was processed by the network. However, in general, it may be difficult and time-consuming to manually determine the correctness of the C-Log data collected.

The generate expected C-Log component 330, (FIG. 4), provides testers with a useful tool for sectionalizing network trouble. Expected C-Logs are generated using functional models for network nodes and services, combined with test call-specific, environmental, subscription, and directory number data, to generate a close approximation to the C-Log data that would be expected if the network processed the test call in the absence of failures. The expected data is necessarily an approximation since actual network call processing depends on random processes (e.g., traffic volume on a particular trunk group). An illustration of an expected C-Log generated for the SCP and corresponding to the actual C-Log shown in FIG. 9a is shown in FIG. 9b.

Since C-Log data may be voluminous, and not all differences between actual and expected C-Logs may be readily apparent, the generated expected C-Log component may also generate a weighted comparison of the differences between actual and expected C-Logs. As an example of the way differences may be weighted, a display comparing the actual time delay for an SCP 20 response to a message from an ASC Switch 10, with the expected time delay for the message, may be based on the magnitude of the difference between the actual and expected delays.

An illustrative example of such a comparative display is shown in FIG. 9c. The only differences emphasized in FIG. 9c are those related to error message and resource parameter values. Also, note that for ease of comparison, the time-stamps on the expected C-Log are indexed to start at the same time as the actual C-Log, and a range of expected response times (i.e., the time limits for acceptable responses) is shown for subsequent messages. Note that since data is only shown for an SCP, synchronization of time-stamps across network nodes is not an issue.

C. Illustrative Example—Testing of Speed Calling Automatic Update Service

An illustrative example of our testing system and method used to test speed calling automatic update service provided in AIN is provided below. First, the normal processing of a call invoking speed calling automatic update service is discussed.

C1. Speed Calling Automatic Update Service

Figure 10:
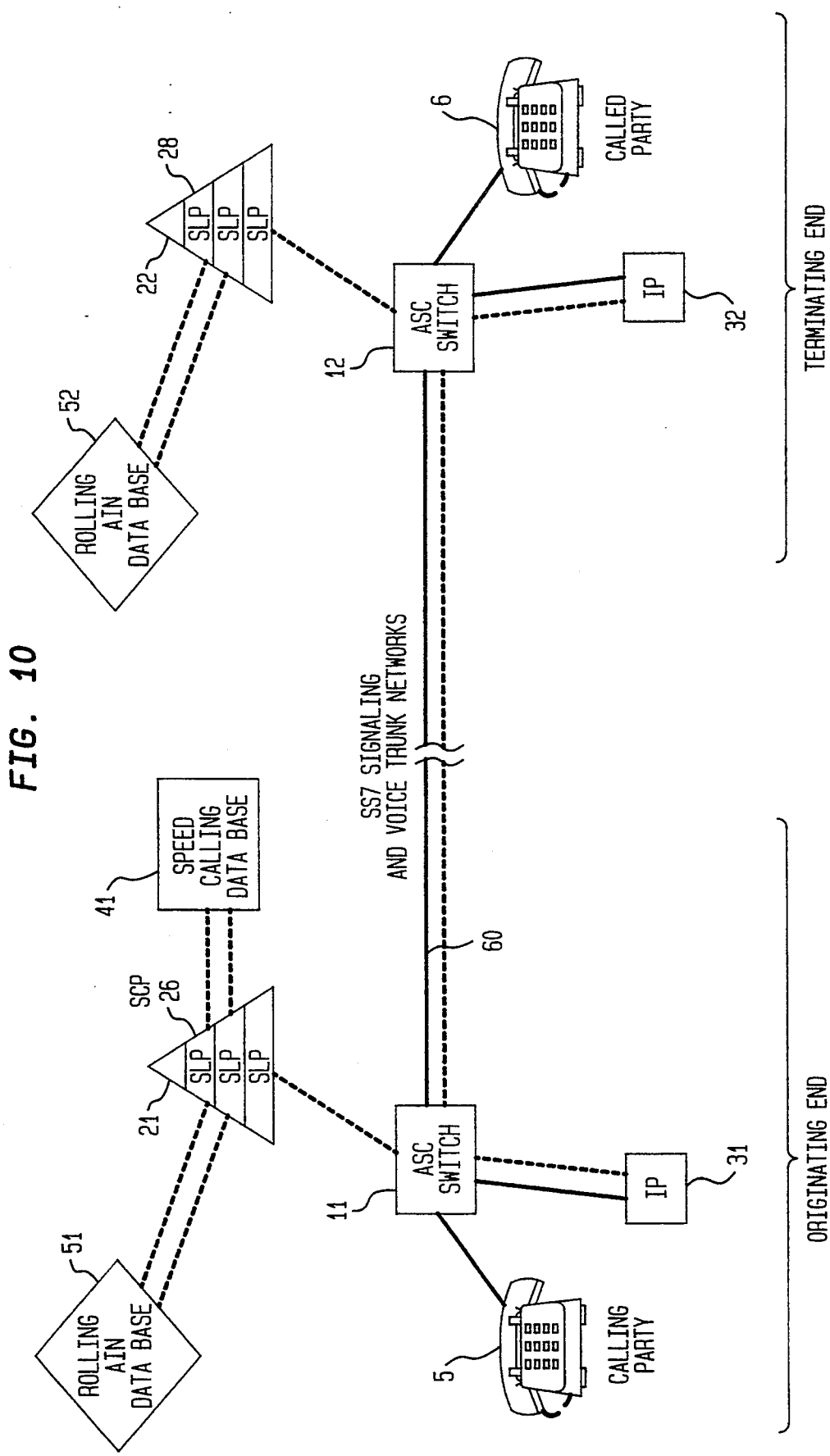
FIG. 10 depicts the AIN network elements involved in providing speed calling automatic update service.

When a subscriber places a call to a non-working or out of service directory number using speed calling and an updated directory number is available, the subscribers can have their speed calling database automatically updated by using speed calling automatic update service. Speed calling automatic update service is illustrated in FIG. 10. A detailed discussion of this service is provided in the co-pending application entitled "Method for Speed Calling Automatic Update", Serial Number 809,923, Dec. 18, 1991.

Processing of a speed call invoking speed calling automatic update service is handled as follows. The calling party 5 places a speed call by entering the abbreviated number (such as 4*) representing the directory number of the called party 6. This abbreviated number is received at the originating ASC switch 11. The originating ASC switch 11 detects that the abbreviated number is for a speed call based upon the speed calling trigger in the calling party's trigger criteria. The ASC switch 11 then queries the originating SCP 21 for a service logic program (originating SLP) 26 to generate instructions and information to route and process the outgoing speed call.

At the originating SCP 21, per instructions from the originating SLP 26, the actual directory number of the called party is retrieved from the speed calling data base 41. Additionally, the originating SCP 21 prepares instructions for the originating ASC switch 11 to place a special tag on the outgoing call, namely, a speed calling service tag, to identify the call as a speed call. These instructions and information are passed from the originating SCP 21 to the originating ASC switch 11.

After tagging the call as a speed call, the originating ASC switch 11 routes the speed call based upon the directory number of the called party to the terminating ASC switch 12, which serves the called party. Upon receiving the speed call and determining that the directory number is out of service, the terminating ASC switch 12 queries the terminating SCP 22 with a message containing the directory number and speed calling tag for instructions to further process the call, At the terminating SCP 22, another SLP called the terminating SLP 28 is executed which causes the rolling AIN data base 52 serving the terminating SCP 22 to be queried for the updated directory number. The updated number is retrieved from the rolling AIN data base 52, and the terminating ASC switch 12 is instructed by the terminating SLP 28 to send a release message to the originating A SC switch 11 containing the updated number for the called party.

The terminating ASC switch 12 transports the REL message to the originating ASC switch 11 as instructed, and the originating ASC switch 11 forwards notification of the REL message and the updated number in a message to the originating SLP 26. The originating SLP 26 then causes all occurrences of the outdated directory number appearing in the speed calling data base 41 to be updated.

After the automatic data base update is completed, the originating SCP 21 instructs the ASC switch 11 to have the IP 31 play an announcement to the calling party 5 advising that the called party's number has changed and has been updated in the speed calling data base and providing the updated number of the called party.

In summary, speed calling automatic update service involves call processing, data base retrieval and update, and messages being transported between nodes such as the A SC switches 11, 12, the SCPs 21,22, the SLPs 26, 27, the speed calling data base 41, and the rolling AIN data base 52. Should a subscriber report trouble in his or her speed calling automatic update service, the trouble could be the result of a problem at any of these network nodes. Our inventive testing system and method allows a tester to isolate trouble in the network by collecting data during a test call as discussed below.

Figure 11A:
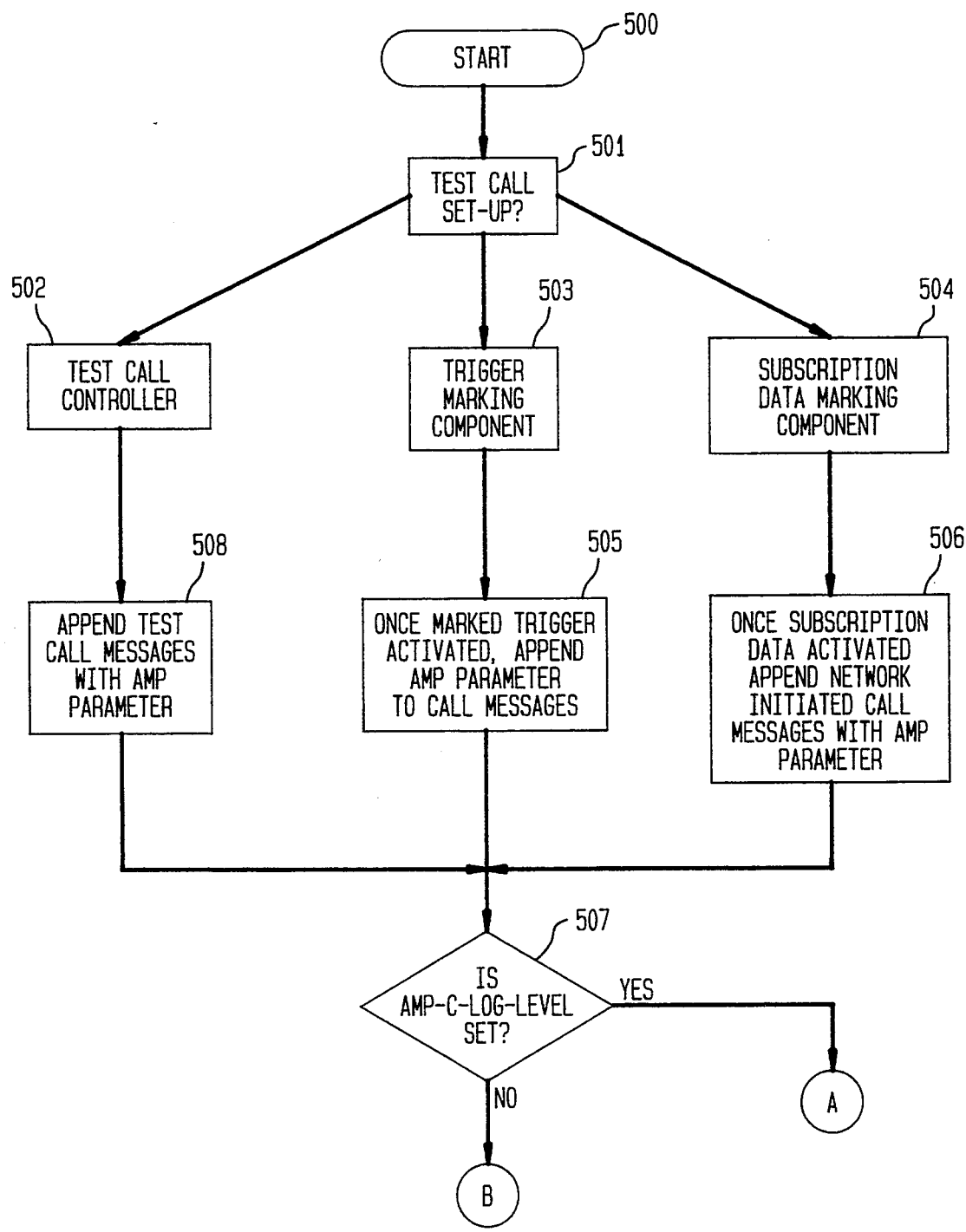
FIGS. 11a, 11b, and 11c depict a flow diagram describing a method of testing a subscriber's speed calling automatic update service in accordance with an aspect of our invention.
Figure 11B:
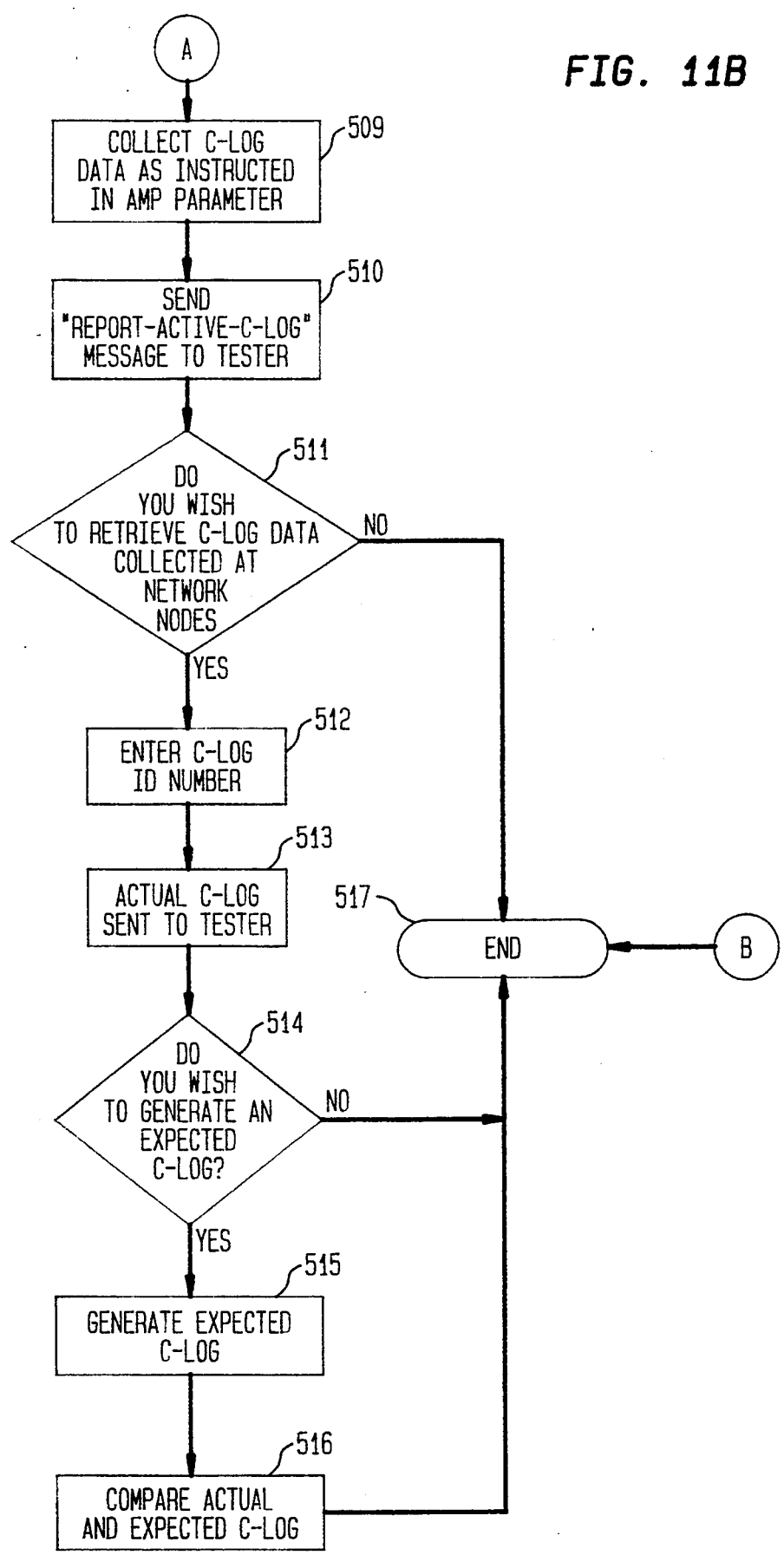
Figure 11C:
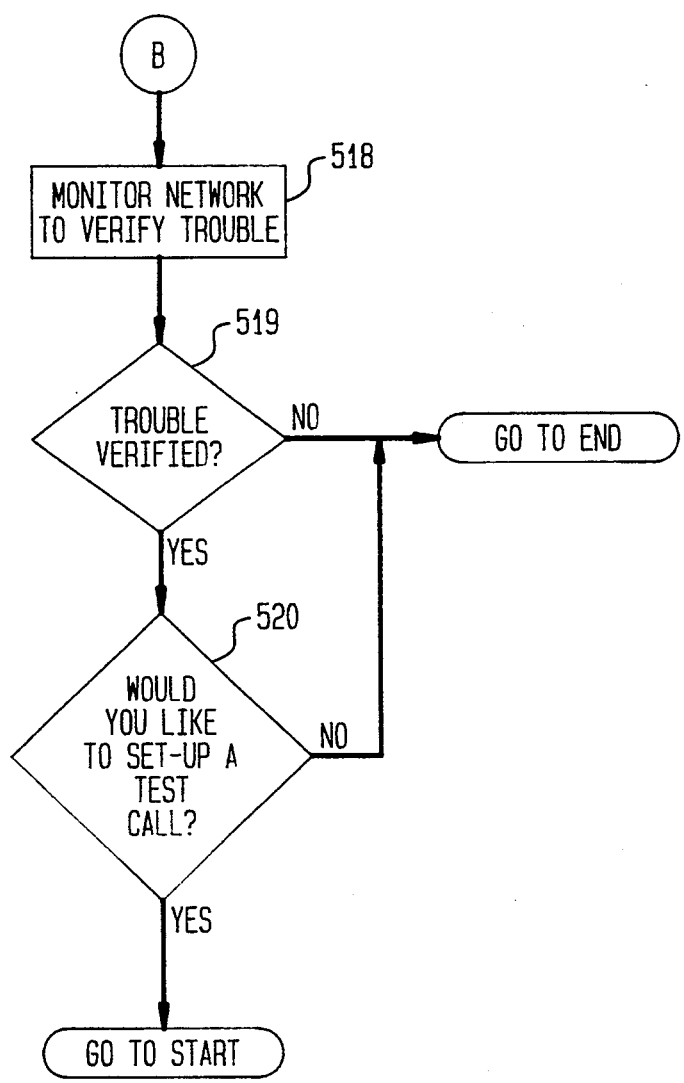

C2. Method for Testing a Subscriber's Speed Calling Automatic Update Service As shown in the flow diagram of FIGS. 11 (a), (b), and (c) to test a subscriber's speed calling automatic update service, a tester can set-up a test call by dialing the test call controller element 502, or by marking speed calling automatic update triggers element 503 in the subscriber's trigger criteria. If this were a service set-up in SCP subscription data, the test call set-up could be conducted by using the SCP subscription marking component, element 504. For illustrative purpose, we assume that test call set-up is performed by dialing the test call controller.

By dialing the directory number for the test call controller, the test call trigger in the test call controller's trigger criteria is activated which causes the test call service logic program at the SCP to be executed. Execution of the program causes several announcements to be played for the tester in the form of queries for information to set-up the test call. First, the tester is queried for his or her security access code. Once cleared for access, the tester is queried for information to define the test call environment such as the time (hour, AM or PM), date (day, month, year, week-day, weekend etc.,), long-haul carrier (AT&T, U.S. Sprint, MCI, etc.,), and to define other attributes of the AMP parameter as discussed in Section B4. The tester will also be queried for the directory number of the subscriber's line to be emulated.

The tester is also queried regarding the level of testing to be conducted. If the purpose for testing is to verify the trouble reported by the subscriber, the tester will respond negatively (by entering "0") to the collection of processing activity data relating to the test call. However, assuming that the purpose for placing the test call is to sectionalize the trouble in the network, the tester will respond positively (by entering "1") such that the call history log capability is activated. By responding positively, an identification number is assigned by the originating ASC switch 11 to the test call to identify processing data collected at individual nodes relating to the test call.

Once execution of the test call SLP is complete, the SLP sends to the originating ASC switch 11 an "Emulate-Line" message, which contains the information to process the test call. This information is encoded in an AMP parameter which is to be appended to each test call message routed in the network. At this point, the tester receives dial tone indicating that the network is ready to place a test call and that the directory number of the called party should be entered. Upon entering the speed calling number (e.g. 4*), a test call will originate from the ASC switch 11 based upon the environment defined by the tester during test call set-up, the subscriber's trigger criteria, and other subscriber-specific data and logic associated with the subscriber. Furthermore, messages relating to the test call will be appended with the AMP parameter element 508 (or element 505 or 506 if test call set-up conducted using trigger marking component SCP or subscription data marking component respectively) defined during test call set-up. From this point in testing, processing of the test call is handled the same regardless of the test call set-up method chosen by the tester.

If the tester places a call using speed calling, then the speed call trigger in the subscriber's criteria will be activated causing the originating ASC switch 11 to send a message to the SCP 21 for further instructions on how to process the call. Upon receiving this message from the ASC switch 11 and identifying the AMP parameter appended to the call message, the SCP 21 will process the call based upon the environment defined in the AMP parameter. If the AMP-C-Log-Level is set at "0" indicating that no data is to be collected for the test call, element 507, the network will be monitored to verify the trouble reported by the subscriber, element 518 of FIG. 11c. If the trouble is verified, element 519, and the tester would like to set up another test call to have data collected, element 520, then the tester can initiate another test call.

If the AMP-C-Log-Level is set appropriately (illustratively "1") element 507, then call processing activity will be logged in the form of actual call history log as instructed by the AMP parameter, element 509. Furthermore, when communicating with the speed calling data base to retrieve the actual directory number of the called number, the SCP 21 will appended to the message the AMP parameter. Upon identifying the AMP parameter, the speed calling data base will also process the test call and log activity relating to the call as indicated in the AMP parameter.

Similarly, as the test call is routed from the originating end of the network to the terminating end of the network and between nodes at the terminating end (e.g., the terminating ASC switch and SCP, 12 and 22, respectively and the rolling AIN data base 52), processing of the test call and collection of processing activity data is handled as defined by the AMP parameter appended to the test call messages. The AMP parameter could be carried between the originating and terminating switches in the SS7 ISDN user protocol generic digits parameter which is reserved for transport of switch-to-switch messages.

It should be noted that messages relating to the test call are passed numerous times back and forth between the same nodes (i.e. between the originating ASC switch and SCP, 11 and 21, respectively); however, each time messages relating to the test call is received, the activity is logged in the C-Log for that test call. Once a C-Log is started at a network node, the node sends to the tester a "Report-Active-C-Log" message, element 510, to alert the tester that data is being collected for the test call.

Depending upon the options selected by the tester during test call-up, the test call may be completed up to and including actually ringing the called party. However, if the AMP-Do-Not-Alert attribute of the AMP parameter is set, the processing of the test call will be completed up to, but not including, ringing the called party.

The following nodes were involved in the processing of the test call: the originating A SC switch and SCP, 11 and 21, respectively, the speed calling and rolling AIN databases 42 and 52, respectively, and the terminating ASC switch and SCP 12 and 22, respectively. Therefore, provided these nodes are equipped with C-Log components, these nodes have generated actual call history logs of data relating to the processing of the test call. If the tester wishes to retrieve the C-Log generated at each of these nodes, element 511, the tester should send a message to the retrieve C-Log component comprising the identification number, element 512, corresponding to the test call. The retrieve C-Log component will, in turn, send a copy of the actual C-Log to the tester directly, element 513. In addition, the tester can have the generate expected C-Log component generate a close approximation to the C-Log, elements 514,515, that would have been expected if the network processed the test call in the absence of network trouble.

Based upon a comparison of the these C-logs, element 516, the tester can determine whether this processing data relating to the subscriber speed calling is working properly. In comparing these C-logs, the tester can more readily sectionalize trouble in the network.

CONCLUSION

Thus, our invention provides a system and method for testing and sectionalizing trouble within a distributed network, such as advanced intelligent network. Our system comprises a test call set-up component and a call history log component. The test call set-up component allows a tester to set up a test call by using a test call controller to emulate a call originating from a subscriber's line, by using a trigger data marking component, and by using a subscription data marking component. During test call set-up a maintenance parameter is defined which is appended to all messages relating to the test call.

Network nodes receiving the test call process the test call based upon the test environment defined in the maintenance parameter and collect messages relating to the test call, if any, based upon instruction in the maintenance parameter. If a call history log has been activated during test call set-up, each network node will be instructed by the maintenance parameter to save processing data relating to the test call. Once the test call is completed, the tester can have the actual C-Logs generated at each network node retrieved. In addition, the tester can have expected C-Logs for each network node generated, which are approximations to the actual C-Log data that would be expected if the network processed the test call in the absence of trouble.

Numerous other alternative embodiments of our inventions may be devised without departure from the spirit and scope of the following claims.

What is claimed is:

1. A testing system for a tester to test a subscriber's service and to sectionalize service trouble in a network comprising a plurality of distributed network nodes, comprising
 a test call set-up component for receiving requests from a tester for testing the subscriber's service and for setting up a test call under a test environment defined by the tester, said test call set up component comprising
  means for appending a maintenance parameter to messages relating to said test call, wherein said maintenance parameter to comprised of attributes containing information as to the test environment and testing instructions and information and
  a test call controller for allowing the tester to place a test call to test the subscriber's service, said test call controller setting up a test call by causing a service logic program to be executed which queries the tester for information defining the test environment, the directory number of the subscriber's line to be tested, testing instructions and information; and
 a call history log component for enabling the tester to have data relevant to the processing of said test call collected at each network node.

2. A testing system for a tester to test a subscriber's service and to sectionalize service trouble in a network comprising a plurality of distributed network nodes, wherein the subscriber has trigger criteria for activating the subscriber's service, comprising
 a test call set-up component for receiving requests from a tester for testing the subscriber's service and for setting up a test call under a test environment defined by the tester, said test call set up component comprising
  means for appending a maintenance parameter to messages relating to said test call, wherein said maintenance parameter is comprised of attributes containing information as to the test environment and testing instructions and information and
  a trigger marking component which allows the tester to mark a trigger in the subscriber's trigger criteria with said maintenance parameter such that upon a call being placed from the subscriber's line which activates any of said marked triggers, the call is appended with said parameter and treated as said test call; and
 a call history log component for enabling the tester to have data relevant to the processing of said test call collected at each network node.

3. A testing system for a tester to test a subscriber's service and to sectionalize service trouble in a network comprising a plurality of distributed network nodes, comprising
 a test call set-up component for receiving requests from a tester for testing the subscriber's service and for setting up a test call under a test environment defined by the tester, said test call set up component comprising
  means for appending a maintenance parameter to messages relating to said test call, wherein said maintenance parameter is comprised of attributes containing information as to the test environment and testing instructions and information and
  a subscription data marking component which allows the tester to mark subscriber's subscription data at the service control point with said maintenance parameter such that upon a call being initiated by the network which activates said subscriber's marked subscription data, the call is appended with said maintenance parameter and treated as said test call; and
 a call history log component for enabling the tester to have data relevant to the processing of said test call collected at each network node.

4. A testing system for a tester to test a subscriber's service and to sectionalize service trouble in a network comprising a plurality of distributed network nodes, comprising
 a test call set-up component for receiving requests from a tester for testing the subscriber's service and for setting up a test call under a test environment defined by the tester, said test call set up component comprising
 means for appending a maintenance parameter to messages relating to said test call, wherein said maintenance parameter is comprised of attributes containing information as to the test environment and testing instructions and information; and
 a call history log, component for enabling the tester to have data relevant to the processing of said test call collected at each network node, said call history log component comprising
  a call history log activation component for defining certain attributes of said maintenance parameter such that processing activity data will be collected for said test call in the form of actual call history logs at network nodes.

5. The testing system of claim 4 wherein said call history log component further comprises
 a call history log retrieval component for allowing the tester to retrieve said actual call history logs collected by network nodes for said test call for sectionalizing trouble within the network.

6. The testing system of claim 5 wherein said call history log component further comprises
 a generate expected call history log component for generating an expected call history log which approximates said actual call history log for each network node that would be expected under normal operating conditions for sectionalizing trouble in the network.

7. The testing system of claim 6 wherein said generate expected call history log component comprises mean for generating weighted comparisons between said actual call history log and said expected call history log.

8. A method for a tester to test a subscriber's service and sectionalize trouble in a network comprising a plurality of distributed network nodes and subscriber communication lines, comprising the steps of:

upon receiving at a switch node a request from a tester for testing the subscriber's service, setting up a test call to test the subscriber's service, said set-up step comprising generating a maintenance parameter to be appended to messages relating to said test call, wherein said maintenance parameter comprises multiple attributes which contain information as to the test environment and testing instructions and information;

routing and processing said test call appended with said parameter at network nodes as a normal call associated with the subscriber's communication line based upon information and instructions within said maintenance parameter;

upon detecting said parameter appended to said test call at any network node and if so instructed by said parameter, saving at the network node actual data relevant to processing said test call in the form of an actual call history log and notifying the tester that the call history log has been opened;

forwarding the actual call history logs from each network node to said tester;

generating an expected call history log for each network node, which approximates the call history log data that would be expected under normal operating conditions; and comparing the actual call history log with the corresponding expected call history log for each network node to isolate trouble in the distributed network.

9. The method for a tester to test a subscriber's service and to sectionalize service trouble in accordance with claim 8 wherein said set-up step further comprises the steps of executing a service logic program which causes the tester to be queried for information including a directory number corresponding to the subscriber's line to be tested and information relating to the test environment, sending the information to said switch node, and prompting the tester for a directory number corresponding to said test call, and wherein said test call emulates a call originating from the subscriber's line based on the test environment defined by the tester, the subscriber's trigger criteria and subscriber-specific data and logic.

10. The method for a tester to test a subscriber's service and to sectionalize service trouble in accordance with claim 8, wherein said set-up step further comprises the step of marking a trigger in the subscriber's trigger criteria with said maintenance parameter such that, upon a call being placed from the subscriber's line which activates any of said marked triggers, messages relating to the call are appended with said parameter and treated as said test call.

11. The method for a tester to test a subscriber's service and to sectionalize trouble in accordance with claim 8, wherein said set-up step further comprises the step of marking the subscriber's subscription data at a service control point with said maintenance parameter such that upon a call be initiated by the network which activates marked subscription data, messages relating to the call are appended with said parameter and treated as said test call.

12. The method of testing a subscriber's service and sectionalizing service trouble in accordance with claim 9, wherein said request for said test call is received from the tester calling from a line other than the subscriber's line being tested physical access to the subscriber's line being tested is not required, and service at the subscriber's line being tested is not disrupted.

13. The method of testing a subscriber's service and sectionalizing service trouble in accordance with claim 9, wherein the tester places a request for said test call from the subscriber's line to be tested.

14. The method of testing a subscriber's service and sectionalizing service trouble in accordance with claim 9 wherein said information to set-up a test call includes an authorization code to verify the tester's authority to have a test call placed.

15. The method of testing a subscriber's service and sectionalizing service trouble in accordance with claim 8, wherein the information in said maintenance parameter includes the time of day that should be emulated when placing said test call.

16. The method of testing a subscriber's service and sectionalizing service trouble in accordance with claim 15, wherein the information in said maintenance parameter includes the day of the week that should be emulated when placing said test call.

17. The method of testing a subscriber's service and sectionalizing service trouble in accordance with claim 8, wherein the information in said maintenance parameter includes whether said test call should be completed up to, but not including, alerting the called party at said destination number.

18. The method of testing a subscriber's service and sectionalizing service trouble in accordance with claim 8, wherein the information in said maintenance parameter includes whether data should be saved at each network node.

19. The method of testing a subscriber's service and sectionalizing service trouble in accordance with claim 8, wherein the information in said maintenance parameter includes the type of data that should be saved at each network node detecting said parameter.

20. The method of testing a subscriber's service and sectionalizing service trouble in accordance with claim 8, wherein the information contained in said maintenance parameter includes whether audible messages should be played to the tester reporting on the status of the network of said test call.

21. The method of testing a subscriber's service and sectionalizing service trouble in accordance with claim 8, wherein the information contained in said maintenance parameter includes whether the subscriber of the communication line should be billed for said test call.

22. The method of testing a subscriber's service and sectionalizing service trouble in accordance with claim 8, further comprising the step of incrementing a sequence attribute of said parameter at each network node logging data of said test call so as to capture the sequence in which network nodes receive said test call.

23. The method of testing a subscriber's service and sectionalizing service trouble in accordance with claim 8, further comprising the step of providing in said parameter a call history log identification number for identifying said call history log generated at network nodes as corresponding to said test call.

24. A method for a tester to test a subscriber's service and sectionalize service trouble in a network comprising a plurality of distributed network nodes and subscriber communications lines, comprising the steps of:

upon receiving at a switch node a request from a tester for testing the subscriber's service, querying the tester for information to set-up a test call, said set-up information comprising a directory number corresponding to the subscriber's line to be tested and information to emulate the environment in which to test the subscriber's service;

upon receiving said requested information, setting up said test call using said requested information, said set-up step comprising appending said test call with a parameter for tracking call processing activity being conducted as said test call is processed by network nodes within the network;

upon completing set-up of said test call, sending dial tone to said tester to acknowledge completion of set-up of said test call;

upon the tester dialing a destination number, placing said test call from said switch node to said destination number and routing said test call in the network as if a normal call was being placed from the subscriber's communication line under test based upon trigger criteria associated with the subscriber's communication line;

upon detecting a particular parameter appended to a message relating to said test call at any network node, saving at the network node actual data relevant to processing said test call in the form of an actual call history log;

generating an expected call history log for each network node, which approximates the call history log data that would be expected under normal operating conditions;

forwarding said actual call history log and said expected call history log for each network node to said tester; and comparing said actual call history log with said corresponding expected call history log for each network node to isolate trouble in the distributed network.

25. A method for a tester to test a subscriber's service and sectionalize service trouble in a network comprising a plurality of distributed network nodes and subscriber communications lines, comprising the steps of:

upon receiving at a switch node a request from a tester for testing the subscriber's service, querying the tester for information to set-up a test call, said set-up information comprising a directory number corresponding to the subscriber's line to be tested and information to emulate the environment in which to test the subscriber's service;

upon receiving said requested information, setting up said test call using said requested information, said set-up step comprising appending said test call with a parameter for tracking call processing activity being conducted as said test call is processed by network nodes within the network;

upon completing set-up of said test call, sending dial tone to said tester to acknowledge completion of set-up of said test call;

upon the tester dialing a destination number, placing said test call from said switch node to said destination number and routing said test call in the network as if a normal call was being placed from the subscriber's communication line under test based upon trigger criteria associated with the subscriber's communication line;

upon detecting g particular parameter appended to a message relating to said test call at any network node, saving at the network node actual data relevant to processing said test call in the form of an actual call history log;

generating an expected call history log for each network node, which approximates the call history log data that would be expected under normal operating conditions;

forwarding said actual call history log and said expected call history for each network node to said tester; and comparing said actual call history log with said corresponding expected call history log for each network node to isolate trouble in the distributed network, wherein said comparing step further comprises generating a weighted comparison of differences between the actual and expected call history logs.

* * * * *